(12) United States Patent
Kamikawa et al.

(10) Patent No.: US 12,503,369 B2
(45) Date of Patent: Dec. 23, 2025

(54) POLYCRYSTALLINE SILICON ROD AND METHOD FOR MANUFACTURING SAME

(71) Applicant: Tokuyama Corporation, Yamaguchi (JP)

(72) Inventors: Takamitsu Kamikawa, Yamaguchi (JP); Miki Emoto, Yamaguchi (JP); Takuya Asano, Yamaguchi (JP)

(73) Assignee: Tokuyama Corporation, Yamaguchi (JP)

( * ) Notice: Subject to any disclaimer, the term of this patent is extended or adjusted under 35 U.S.C. 154(b) by 703 days.

(21) Appl. No.: 17/634,269

(22) PCT Filed: Aug. 20, 2020

(86) PCT No.: PCT/JP2020/031410
§ 371 (c)(1),
(2) Date: Jul. 7, 2022

(87) PCT Pub. No.: WO2021/039569
PCT Pub. Date: Mar. 4, 2021

(65) Prior Publication Data
US 2022/0402765 A1    Dec. 22, 2022

(30) Foreign Application Priority Data

Aug. 23, 2019 (JP) .................... 2019-152508

(51) Int. Cl.
*C01B 33/02* (2006.01)
*C01B 33/035* (2006.01)

(52) U.S. Cl.
CPC ............ *C01B 33/02* (2013.01); *C01B 33/035* (2013.01)

(58) Field of Classification Search
CPC ..... C01B 33/035; C01B 33/037; C01B 33/02; C01B 33/03; C23C 16/24; C23C 16/46;
(Continued)

(56) References Cited

U.S. PATENT DOCUMENTS 11,498,840 B2    11/2022  Nishimura
2012/0052297 A1  3/2012   Pech et al.
(Continued)

FOREIGN PATENT DOCUMENTS

JP    3158328 B2 *   4/2001
JP    2012062243 A   3/2012
(Continued)

OTHER PUBLICATIONS

Machine translation of JP-3158328-B2 (Year: 2001).*
(Continued)

*Primary Examiner* — Sally A Merkling
*Assistant Examiner* — Logan Laclair
(74) *Attorney, Agent, or Firm* — CAHN & SAMUELS, LLP (57) ABSTRACT

A method for producing a polycrystalline silicon rod includes: while energizing a core wire formed of silicon, supplying a polycrystalline silicon deposition raw material gas into a reactor so as to perform gas phase growth of polycrystalline silicon on a surface of the core wire, in which during a period from a completion of cleaning of the surface of the above core wire to an installation of the core wire in the reactor, the silicon core wire is placed in an atmosphere adjusted to a cleanliness of Class 4 to Class 6 as defined in ISO 14644-1. With this method, it is possible to obtain a polycrystalline silicon rod which has a total metal concentration of iron and nickel of 40 pptw or less in terms of elements in a region within 2 mm from an interface between the core wire and polycrystalline silicon deposited on the surface of the core wire.

8 Claims, 3 Drawing Sheets

(58) Field of Classification Search
CPC ............... C01P 2006/80; C01P 2004/12; B01J 2219/0828; B01J 2219/0837
See application file for complete search history.

(56) References Cited

U.S. PATENT DOCUMENTS

| | | | |
|---|---|---|---|
| 2012/0060562 A1* | 3/2012 | Wochner | C01B 33/02 65/472 |
| 2016/0273099 A1 | 9/2016 | Wochner | |
| 2019/0248657 A1* | 8/2019 | Ito | C23C 16/46 |
| 2021/0114884 A1 | 4/2021 | Nishimura | |
| 2022/0089341 A1 | 3/2022 | Sakida | |

FOREIGN PATENT DOCUMENTS

| | | |
|---|---|---|
| JP | 2015030628 A | 2/2015 |
| WO | 2017221952 A1 | 12/2017 |

OTHER PUBLICATIONS

English Abstract for WO2017221952A1, Dec. 28, 2017.
English Abstract for JP2012062243 A, Mar. 29, 2012.
English Abstract for JP2015030628 A, Feb. 16, 2015.
English translation of International Preliminary Report on Patentability, Mar. 3, 2022.
Ulpatek Air Filter Technology, EN ISO 14644-1, https://www.ulpatek.com/tr/filtre-teknolojisi/en-iso-14644-1/, retrieved on Dec. 4, 2024, pp. 1-2.

* cited by examiner

though the cleaning has been sufficiently
POLYCRYSTALLINE SILICON ROD AND METHOD FOR MANUFACTURING SAME This application is a U.S. national stage application of PCT/JP2020/031410 filed on 20 Aug. 2020 and claims priority to Japanese patent document 2019-152508 filed on 23 Aug. 2019, the entireties of which are incorporated herein by reference.

TECHNICAL FIELD

The present invention relates to a novel polycrystalline silicon rod and a production method therefor. Specifically, the present invention provides a polycrystalline silicon rod in which concentrations of heavy metals contained inside polycrystalline silicon are effectively reduced and a method for manufacturing the same.

BACKGROUND OF THE INVENTION

Figure 1:
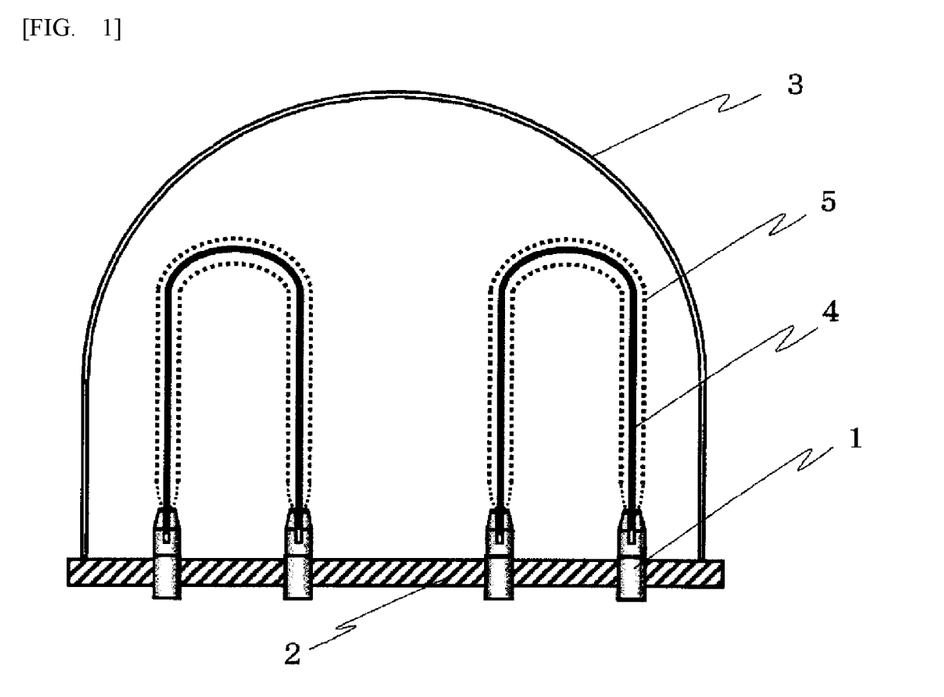
FIG. 1 is a schematic view of a polycrystalline silicon deposition reactor by a Siemens method.

Polycrystalline silicon used as a raw material for semiconductors or wafers for photovoltaic power generation is generally produced by a Siemens method. In production of polycrystalline silicon by the Siemens method, as illustrated in FIG. 1, core wires 4 (hereinafter, also referred to as silicon core wires) formed of silicon are connected to electrodes 1 provided on a bottom plate 2, the above silicon core wires are covered with a domical cover 3, a polycrystalline silicon deposition raw material gas containing a gas of a silane compound such as trichlorosilane and a reducing gas such as hydrogen is supplied to the formed space, and the above silicon core wires 4 are heated by energization so as to perform gas phase growth of polycrystalline silicon 5 on surfaces of the silicon core wires to obtain polycrystalline silicon rods.

Since the silicon core wire used for producing polycrystalline silicon is generally obtained by cutting a part of a polycrystalline silicon rod or the like into a thin rod by using a metal blade, metal fine powder adheres to the silicon core wire due to friction of the above blade or the like immediately after the cutting, and the surface of the silicon core wire is contaminated. Therefore, in general, the above silicon core wire is immersed in a cleaning tank containing a cleaning solution made of a mixed solution of hydrofluoric acid and nitric acid to bring the surface of the silicon core wire into contact with the cleaning solution for cleaning, and then a silicon core wire that has been rinsed with water, dried, and sufficiently cleaned is used for producing polycrystalline silicon.

In recent years, there has been an increasing demand for cleanliness inside polycrystalline silicon. In such a circumstance, the present inventors have investigated a source of heavy metals inside polycrystalline silicon. As a result, it has been found that the surface of the silicon core wire immediately after cleaning has a surprisingly high heavy metal concentration even though the cleaning has been sufficiently performed. As a result of further investigation, it has been found that when the above silicon core wire comes into contact with outside air containing heavy metals, the surface of the above silicon core wire is immediately contaminated even in a very short time contact. Further, the present inventors have confirmed that when the above contaminated silicon core wire is used, the heavy metals on the surface of the core wire diffuse into polycrystalline silicon during the growth of polycrystalline silicon, and as a result, a purity of the entire polycrystalline silicon rod is lowered.

On the other hand, regarding the contamination on the surface of the silicon core wire, as a method for avoiding contamination due to gloves and the like used during handling, a method for bagging the silicon core wire immediately after cleaning has been proposed (for example, Patent Literature 1). Thus, the gloves and the like do not come into direct contact with the silicon core wire, and thus the contamination of the silicon core wire can be minimized. However, even when the silicon core wire is bagged and stored and transported as in the method, the bag must be removed from the silicon core wire after the silicon core wire is connected to the electrodes and before the bottom plate is covered with the cover. At this time, the silicon core wire cannot be prevented from coming into contact with the outside air of which cleanliness is not controlled, and heavy metal contamination on the surface of the silicon core wire may occur. Moreover, in such a method, static electricity is generated due to friction between the bag and the silicon core wire when removing the bag, and the heavy metals in the outside air are more easily to be adsorbed on the surface of the silicon core wire, and there is a concern that the problems is more apparent.

CITATION LIST

Patent Literature

Patent Literature 1: JP-A-2015-030628

SUMMARY OF INVENTION

Therefore, an object of the present invention is to provide a polycrystalline silicon rod obtained by gas phase growth of polycrystalline silicon on a surface of a silicon core wire, in which concentrations of heavy metals inside the polycrystalline silicon are sufficiently reduced, and a method for manufacturing the same.

Solution to Problem

As a result of intensive studies to solve the above problems, the present inventors have succeeded in obtaining a polycrystalline silicon rod having a high cleanliness in which concentrations of heavy metals caused by contamination of a silicon core wire are sufficiently reduced by adjusting an atmosphere in a vicinity of the above silicon core wire to a specific condition and maintaining the atmosphere during a period from a completion of cleaning of a surface of the silicon core wire to connection of the silicon core wire to electrodes and covering of a bottom plate with a cover from an upper portion of the silicon core wire, and have completed the present invention.

That is, the present invention provides a polycrystalline silicon rod including a core wire formed of silicon, in which a total metal concentration of iron and nickel is 40 pptw or less in terms of elements in a region (hereinafter, also referred to as a silicon interface region) within 2 mm from an interface between the core wire and polycrystalline silicon deposited on a surface of the core wire (hereinafter, also referred to as a silicon interface).

Further, in the polycrystalline silicon rod according to the present invention, in the silicon interface region, an iron concentration is preferably 20 pptw or less in terms of elements, and a nickel concentration is preferably 5 pptw or less in terms of elements.

The above polycrystalline silicon rod according to the present invention can be obtained by a method for producing a polycrystalline silicon rod, and the method includes: using a reactor including a bottom plate provided with electrodes for energizing a core wire formed of silicon and a domical cover covering the bottom plate; and while the core wire is connected to the electrodes and energized, supplying a polycrystalline silicon deposition raw material gas into the reactor so as to perform gas phase growth of polycrystalline silicon on a surface of the core wire, in which during a period from a completion of cleaning of the surface of the core wire to connection of the core wire to the electrodes and covering of the bottom plate with the cover from an upper portion of the core wire, the core wire is placed in an atmosphere adjusted to a cleanliness of Class 4 to Class 6 as defined in ISO 14644-1.

In the polycrystalline silicon rod according to the present invention, a contamination amount caused by heavy metals in the silicon interface region is suppressed to an extremely low level, and concentrations of iron and nickel in the silicon interface region are reduced to a surprising level of 40 pptw or less in terms of elements. Accordingly, a purity of the entire rod can be made higher than that of a conventional polycrystalline silicon rod, and inventive polycrystalline silicon rod is useful for applications requiring higher-quality silicon crystals.

DETAILED DESCRIPTION OF INVENTION

<Polycrystalline Silicon Rod>

Figure 2:
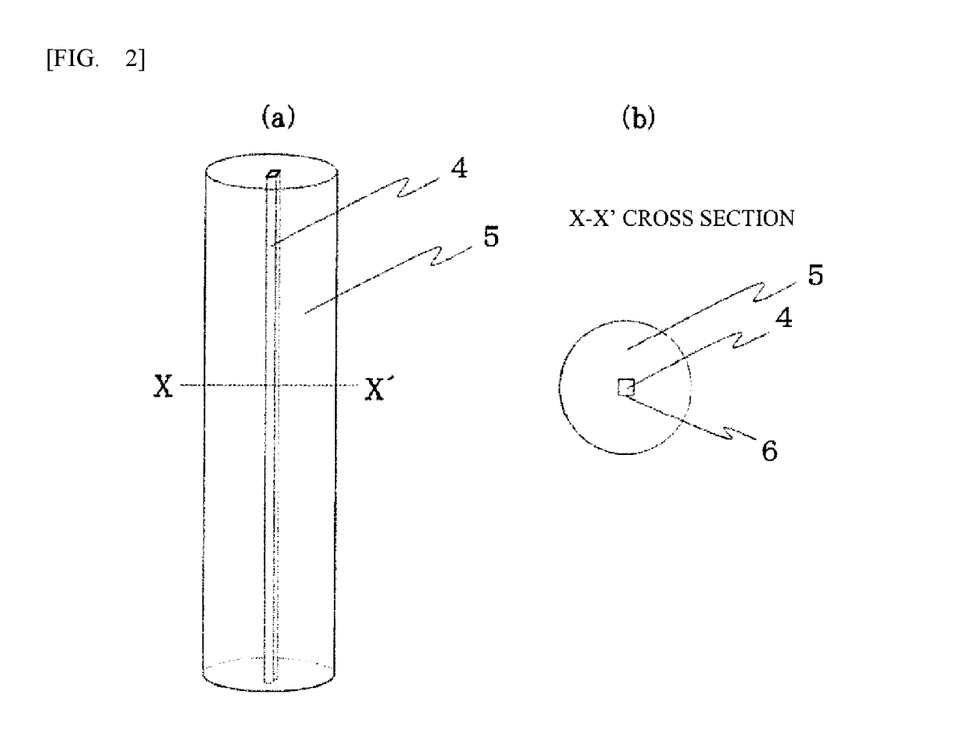
FIG. 2 shows a schematic view illustrating a typical polycrystalline silicon rod according to the present invention and a cross-sectional view thereof.

A polycrystalline silicon rod according to the present invention is a long polycrystalline silicon rod produced by a Siemens method as illustrated in a schematic view in (a) of FIG. 2, and is formed by depositing the polycrystalline silicon 5 around the silicon core wire 4 as in an X-X' cross section illustrated in (b) of FIG. 2. Polycrystalline silicon is also referred to polysilicon, and is an aggregate of fine silicon crystals.

A diameter of the polycrystalline silicon rod is not particularly limited, and is preferably 75 mm to 180 mm, more preferably 100 mm to 160 mm, and still more preferably 110 mm to 150 mm. When the diameter is large, the larger the amount of polycrystalline silicon can be obtained in one production process.

A silicon interface 6, which is a boundary where the silicon core wire 4 and the polycrystalline silicon 5 deposited on the surface of the silicon core wire are in contact with each other, is present in the polycrystalline silicon rod. That is, the silicon core wire 4 and the polycrystalline silicon 5 are in contact with each other with the silicon interface 6 interposed therebetween. In the present invention, a region having a total thickness of 4 mm with the silicon interface 6 interposed in center thereof is referred to as "silicon interface region". The silicon interface region means a total of a region having a depth of 2 mm in a direction of the silicon core wire 4 from the silicon interface 6 and a region having a depth of 2 mm in a direction of the deposited polycrystalline silicon 5 from the silicon interface 6.

The most characteristic feature of the polycrystalline silicon rod according to the present invention is that a total metal concentration of iron and nickel in the silicon interface region is 40 pptw or less, preferably 30 pptw or less, and particularly preferably 15 pptw or less in terms of elements. Further, for each element, an iron concentration is preferably 20 pptw or less, and particularly preferably 10 pptw or less, and a nickel concentration is preferably 10 pptw or less, and particularly preferably 5 pptw or less.

The iron and nickel are typical pollutants of the silicon core wire due to contact with outside air, and are heavy metals that are likely to diffuse at a silicon deposition temperature, and are thus heavy metals that may spread contamination throughout the silicon rod. In the present invention, a cleanliness of the polycrystalline silicon rod caused by the silicon core wire is determined by metal concentrations of these heavy metals.

Regarding concentrations of other heavy metals measured in the silicon interface region, specifically, it is more preferable that a chromium concentration is 10 pptw or less, particularly 5 pptw or less, a copper concentration is 5 pptw or less, and a zinc concentration is 5 pptw or less.

It is difficult to accurately measure the concentrations of the iron and nickel at the silicon interface. However, according to study of the present inventors, it has been found that, although the concentrations of the heavy metals decrease as increasing the distance from the silicon core wire i due to diffusion, an influence of heavy metal contamination on the surface of the silicon core wire to bulk contamination (heavy metal contamination) of the polycrystalline silicon rod can be accurately evaluated by measuring heavy metal concentrations in a region within 2 mm from the silicon-core wire interface (total thickness of 4 mm). Therefore, in the present invention, the silicon interface region is sampled, and the heavy metal concentrations are used as an index of contamination of the polycrystalline silicon rod due to surface contamination of the silicon core wire.

Hereinafter, a method for preparing a sample for measuring the heavy metal concentrations in the silicon interface region will be described with reference to FIG. 3.

Figure 3:
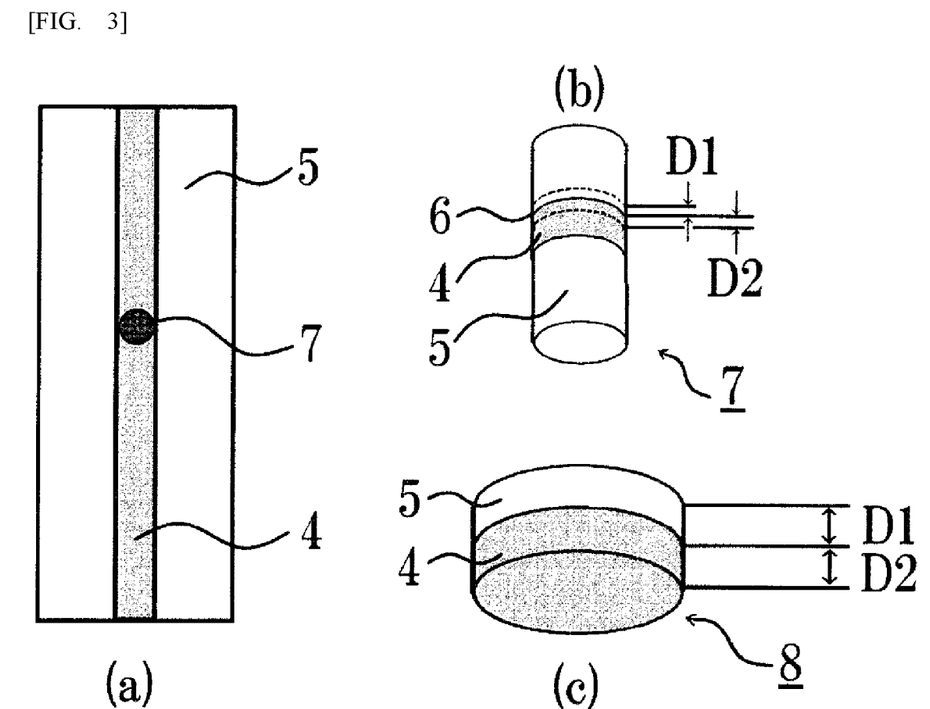
FIG. 3 is a schematic view illustrating a procedure for cutting out, from a polycrystalline silicon rod, a sample for measuring a metal concentration according to the present invention.

First, as illustrated in (a) of FIG. 3, from a side surface of the polycrystalline silicon rod, the above silicon rod is punched out perpendicularly to an axial direction of the silicon core wire 4 and in a circle having a size including the silicon core wire while centering on the silicon core wire to obtain a cylindrical core ring rod 7. Such punching can be performed by using a core drill. At this time, the punching is performed such that the core ring rod 7 having a diameter of 4 mm penetrating the silicon core wire can be obtained. Subsequently, as illustrated in (b) of FIG. 3, the above core ring rod 7 is cut on a plane perpendicular to an axis line such that thicknesses D1 and D2 are 2 mm interposing the silicon interface 6 to obtain a sample 8. As illustrated in (c) of FIG. 3, D1 is a thickness of the polycrystalline silicon 5 in the sample 8, and D2 is a thickness of the silicon core wire 4 in the sample 8.

D1 and D2 may be 2 mm or more at the time of cutting, and the above D1 and D2 may be adjusted to 2 mm by an etching treatment or the like on the sample 8 after cutting.

The sample 8 cut out as described above is etched with a mixed acid solution of hydrofluoric acid and nitric acid to eliminate metal contamination attached during cutting, a mass measurement is carried out, then the sample is placed in a closed container made of fluororesin to completely dissolve and remove silicon by a vapor phase decomposition reaction of hydrofluoric acid and nitric acid, and a residue remaining in the container is recovered with sulfuric acid. Next, the amount of metals in the above recovered residue is measured by inductively coupled plasma mass spectrometry (ICP-MS), and the metal concentrations are calculated based on the measured values and the mass of the sample.

In the polycrystalline silicon rod according to the present invention, since a content of the heavy metals in the silicon interface region is suppressed to be extremely low, the polycrystalline silicon rod can contribute to reduction of the bulk contamination (heavy metal content) of the grown polycrystalline silicon.

<Method for Producing Polycrystalline Silicon Rod>

A method for producing a polycrystalline silicon rod according to the present invention is not particularly limited, and a typical production method includes the steps of: using a reactor including a bottom plate provided with electrodes for energizing a silicon core wire and a domical cover covering the bottom plate; and while the core wire is connected to the electrodes and energized, supplying a polycrystalline silicon deposition raw material gas into the reactor so as to perform gas phase growth of polycrystalline silicon on a surface of the core wire, in which during a period from a completion of cleaning of the surface of the silicon core wire to connection of the silicon core wire to the electrodes and covering of the bottom plate with the cover from an upper portion of the core wire, the silicon core wire is placed in an atmosphere adjusted to a cleanliness of Class 4 to Class 6 as defined in ISO 14644-1.

As the silicon core wire of the present invention, for example, separately produced polycrystalline silicon, single crystal silicon, or melt-solidified silicon cut into a thin rod is used without limitation. However, metal concentrations inside the silicon core wire influence heavy metal concentrations on the surface of the silicon core wire, and further influence the purity of the obtained polycrystalline silicon rod, and thus the metal concentrations inside the silicon core wire are preferably low. Specifically, an iron concentration is 20 pptw or less, preferably 10 pptw or less, and more preferably 5 pptw or less, a nickel concentration is 10 pptw or less, preferably 2 pptw or less, a chromium concentration is 10 pptw or less, preferably 5 pptw or less, a copper concentration is 5 pptw or less, and a zinc concentration is 5 pptw or less.

A cross-sectional shape of the silicon core wire may be any of a circular shape, an elliptical shape, a substantially square shape, and a polygonal shape. For example, in the case of the substantially square shape, a length of one side is generally about 6 mm to 15 mm, more preferably 6 mm to 12 mm, and still more preferably 7 mm to 10 mm. Similarly, in the case of the circular shape, a diameter of the circular shape is generally about 6 mm to 15 mm, more preferably 6 mm to 12 mm, and still more preferably 7 mm to 10 mm.

In the method according to the present invention, the surface of the silicon core wire is purified by a known method. Specifically, a method for etching with a mixed acid solution of hydrofluoric acid and nitric acid is suitable. The concentrations of metals present on the surface of the above purified silicon core wire are preferably low, and the iron concentration is 30 pptw or less, preferably 10 pptw or less, and more preferably 5 pptw or less, the nickel concentration is 10 pptw or less, preferably 2 pptw or less, the chromium concentration is 10 pptw or less, preferably 5 pptw or less, the copper concentration is 10 pptw or less, preferably 5 pptw or less, and the zinc concentration is 5 pptw or less.

The most characteristic feature of the production method according to the present invention is that during the period from the completion of cleaning of the surface of the silicon core wire to the connection of the core wire to the electrodes and covering of the bottom plate with the cover from the upper portion of the core wire, the silicon core wire is placed in the atmosphere adjusted to a cleanliness of Class 4 to Class 6 as defined in ISO 14644-1. Thus, polycrystalline silicon can be deposited on the surface of the silicon core wire while maintaining the heavy metal concentrations on the surface of the silicon core wire as in a low state immediately after the cleaning treatment, and the purity of the obtained polycrystalline silicon rod can be further improved.

The ISO 14644-1 is an international standard for defining an air cleanliness of a clean room. The reason of setting the cleanliness to Class 4 to Class 6 is that when the cleanliness is insufficient, the surface of the silicon core wire 4 is contaminated, and bulk contamination of the obtained polycrystalline silicon rod cannot be sufficiently reduced, and when the cleanliness is too high, a cost for achieving a high cleanliness will be enormous. A particle counter, a remote laser radar particle counter, or the like can be used to check the above cleanliness of the atmosphere.

In the production method according to the present invention, the period from the completion of cleaning of the surface of the silicon core wire after processing to the connection of the silicon core wire to the electrodes and covering of the bottom plate with the cover from the upper portion of the silicon core wire refers to a period from a time immediately after the silicon core wire is taken out of a cleaning tank in the cleaning treatment on the silicon core wire to a state where the bottom plate is covered with the cover such that the silicon core wire cannot come into contact with the outside air.

In the production method according to the present invention, the method for placing the silicon core wire in the atmosphere adjusted to the above cleanliness is not particularly limited as long as the method can maintain a state where the silicon core wire is always placed in an atmosphere formed by a gas cleaned to such an extent that a target cleanliness can be achieved, preferably air in consideration of workability. For example, it is conceivable to perform all steps from the completion of cleaning of the surface of the silicon core wire to the connection of the silicon core wire to the electrodes and covering of the bottom plate with the cover from the upper portion of the core wire in one clean room, but a lot of equipment is required.

Figure 4:
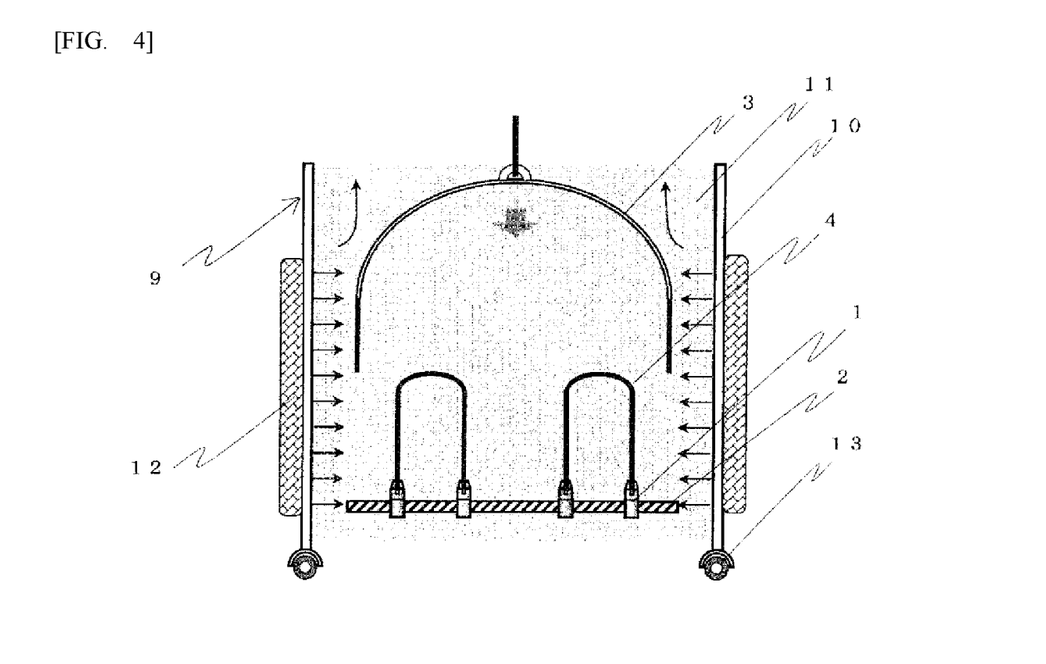
FIG. 4 is a schematic view illustrating one form of a method for producing a polycrystalline silicon rod according to the present invention.

Therefore, as illustrated in FIG. 4, it is preferable to prepare a cylindrical clean booth 9, which is formed by providing a shielding member 11 such as a resin sheet or a panel between supporting pillars 10, is large enough to surround the bottom plate 2 of the reactor, and has a height sufficiently higher than a height when the silicon core wire is installed on the above bottom plate, so that the silicon core wire is always present in the clean booth 9 in each of the steps of handling the silicon core wire, and it is preferable to move the clean booth together with the core wire when transferring the silicon core wire between the steps. In order to simplify the above movement, it is preferable to provide a caster 13 at a lower portion of each of the supporting pillars of the clean booth as illustrated in FIG. 4.

FIG. 4 illustrates a state where the bottom plate 2 of the reactor is covered with the cover 3, which is a final step, and even in this state, the silicon core wire 4 can maintain a high cleanliness in the clean booth.

Further, in another embodiment, i the clean booth is independently provided for each of the steps, and the silicon core wire is moved between the clean booths by storing the silicon core wire in a closed container in the clean booth, and moving to the clean booth of a next step. In this case, as a method for adjusting the inside of the clean booth to the above cleanliness, which will be described later, the same method may be adopted for all clean booths, or methods different from each other may be adopted for each clean booths.

In the present invention, as the method for adjusting the inside of the clean booth to the above cleanliness, known methods are adopted without particular limitation. Examples thereof include a horizontal air flow convection method carried out by ejecting cleaned air from a header 12 (a device that supplies the cleaned air to the header is omitted in the figure) into the clean booth as a parallel flow and discharging the air from upper and lower openings as illustrated in FIG. 4, a turbulent flow method (conventional flow), a vertical laminar flow method (down flow), and the like, and these air supply methods are adopted without any particular limitation.

In particular, in the horizontal air flow convection method, the cleaned air collides near a center of the reactor and the air is pushed out to the upper and lower openings, and thus air inside the cover is easily replaced with the cleaned air when the cover of the reactor is lowered after the silicon core wire is installed on the bottom plate. As a result, the bottom plate can be covered while maintaining the cleanliness inside the cover. Further, by the air flow, a contamination of metal fine powder falling from a hanging jig such as a crane can be effectively prevented.

In the present invention, known steps for producing a silicon rod having a high purity are adopted without particular limitation as steps after attaching the cover to the bottom plate of the reactor, for example, replacing the gas in the reactor in which the silicon core wire is present, purifying the raw material gas such as trichlorosilane and hydrogen, supplying the raw material gas, heating the silicon core wire, adjusting the amount of energization during silicon deposition, disconnecting a power supply after silicon deposition, taking out the obtained polycrystalline silicon rod, and the like.

Specifically, as hydrogen used for deposition, it is preferable to purify and use hydrogen generated by electrolysis of saline as described in JP-A-2013-212974. As trichlorosilane, it is preferable to use trichlorosilane having a high purity obtained by repeatedly distilling and purifying crude trichlorosilane obtained by a reaction of metallurgical silicon and hydrogen chloride, or a reaction of metallurgical silicon, silicon tetrachloride, and hydrogen.

The purity of the obtained trichlorosilane can be confirmed by ICP-MS by sampling the obtained trichlorosilane in a quartz flask, evaporating to dryness under an inert gas stream such as helium or argon after weighing, and then putting dilute nitric acid into the flask and recovering the trichlorosilane. Regarding the purity of trichlorosilane, for example, a Fe concentration is preferably 1 ppbw or less, and more preferably 0.5 ppbw or less. Ni and Cr concentrations are each 0.5 ppbw or less, and preferably 0.2 ppbw or less.

According to the production method of the present invention, contamination of the surface of the silicon core wire caused by heavy metals contained in the outside air can be effectively avoided, and as a result, a high-purity polycrystalline silicon rod that is not influenced by such contamination can be stably obtained.

EXAMPLES

Hereinafter, the present invention will be described based on more detailed examples, but the present invention is not limited to these examples.

Evaluation items and evaluation methods of polycrystalline silicon rods obtained in Examples and Comparative Examples are explained below.

1) Heavy Metal Concentration in Silicon Interface Region

First, the sample 8 was prepared by the following method.

From a side surface of a polycrystalline silicon rod, the silicon rod was punched out with a core drill perpendicularly to an axial direction of the silicon core wire 4 and in a circle having a diameter of 4 mm penetrating the silicon core wire to obtain the cylindrical core ring rod 7. Subsequently, the core ring rod 7 was cut on a plane perpendicular to an axis line of the core ring rod by a crystal cutter (OD saw (trade name, produced by MARUTO INSTRUMENT CO., LTD.)) such that the thickness D1 of the polycrystalline silicon 5 and the thickness D2 of the silicon core wire 4 were each about 3 mm interposing the silicon interface 6. Then, in order to eliminate metal contamination attached during the steps for obtaining the above sample, about 1 mm was etched from the surface with fluorinated nitric acid to obtain the sample 8 having the thicknesses D1 and D2 of 2 mm. The same operation was performed at the upper and lower silicon interfaces 6 of the core ring rod 7 to obtain two samples 8.

The above samples 8 were installed in a PTFE vapor phase decomposition container, the container was heated on a hot plate, and vapor phase decomposition was performed with vapor of fluorinated nitric acid. After cooling the container, residues were recovered with 1 ml of sulfuric acid, and each metal concentration was quantified by ICP-MS (Agilent 8800). Based on the obtained measured values, the metal concentrations in the silicon interface region were calculated according to the following equation, and an average value was obtained.

$$Q = \frac{(C - C_b)}{W} \times L \qquad \text{[Equation 1]}$$

Q: Metal concentration [pptw] in silicon interface region

C: Measured value [ng/L]

$C_b$: Operation blank value [ng/L]

W: Weight [g] of sample 8

L: Amount [L] of sulfuric acid used for recovery

2) Measurement of Cleanliness in Clean Booth

The number of particles of 0.3 μm and 0.5 μm was measured by using a particle counter (KC-51, RION Co., Ltd.). The number of measurement points are appropriately selected according to an area of the clean booth in accordance with ISO 14644-1 or JIS B 9920-1.

Example 1

A polycrystalline silicon rod containing iron of 5 pptw, nickel of 2 pptw, chromium of 1 pptw, copper of 1 pptw or less, and zinc of 1 pptw or less was cut into a thin rod of 8 mm square by using a blade to obtain a silicon core wire. The above silicon core wire was immersed in a cleaning tank containing a cleaning solution made of a mixed solution of hydrofluoric acid and nitric acid for cleaning. Then, in a down flow type clean booth, rinsing with water, drying by air, and welding of the silicon core wire were performed to obtain a gate-shaped silicon core wire. It was confirmed that the inside of the above clean booth was adjusted to a cleanliness of Class 6 as defined in ISO 14644-1.

After welding, in order to prevent contamination during transportation, the silicon core wire was packed in a closed container in the clean booth used in the silicon cleaning step and then transported to a reactor.

In the reactor, the clean booth (horizontal air flow convection method) illustrated in FIG. 4 was set so as to surround the bottom plate 2, and the silicon core wire 4 was taken out from the closed container in the clean booth 9 and installed on the high-purity treated graphite electrodes 1.

It was confirmed that the inside of the above clean booth was adjusted to a cleanliness of Class 6 as defined in ISO 14644-1.

Then, the cover 3 of the reactor was lowered from an upper portion of the clean booth, attached to the bottom plate 2, and then the clean booth 9 was removed.

Next, after gas replacement in the reactor, trichlorosilane and hydrogen were supplied as raw material gases to carry out deposition of silicon at 950° C. to obtain a polycrystalline silicon rod having a diameter of about 120 mm.

As a result of quantifying the purity of trichlorosilane used for the above deposition by the analysis method explained above, a Fe concentration was 0.5 ppbw or less, and Ni and Cr concentrations were each 0.2 ppbw or less.

For the polycrystalline silicon rod obtained by the above method, heavy metal concentrations in a silicon interface region were measured, and results were shown in Table 1. For the above measurement of heavy metals, samples were prepared at three locations for one rod, and average values were shown.

Example 2

A polycrystalline silicon rod was obtained in the same manner as in Example 1 except that a mobile clean booth (horizontal air flow convection method) illustrated in FIG. 4 was used as a clean booth and each step was carry out while moving the clean booth. In Example 2, it was confirmed that the inside of the clean booth was adjusted to a cleanliness of Class 6 as defined in ISO 14644-1.

For the polycrystalline silicon rod obtained by the above method, heavy metal concentrations in a silicon interface region were measured in the same manner as in Example 1, and results are shown in Table 1.

Comparative Example 1

A silicon core wire was installed and polycrystalline silicon rod was produced in the same manner as in Example 1 except that a clean booth was not used when the core wire was installed in the reactor.

For the polycrystalline silicon rod obtained by the above method, heavy metal concentrations in a silicon interface region were measured in the same manner as in Example 1, and results are shown in Table 1.

TABLE 1

| | Heavy metal concentration (pptw) in silicon interface region | | | | |
|---|---|---|---|---|---|
| | Fe | Cr | Ni | Cu | Zn |
| Example 1 | 24 | 1 | 2 | 1 | 1 |
| Example 2 | 18 | 1 | 1 | 1 | 1 |
| Comparative Example 1 | 120 | 21 | 15 | 11 | 6 |

REFERENCE SIGNS LIST

1 Electrode
2 Bottom plate
3 Cover
4 Silicon core wire
5 Polycrystalline silicon
6 Silicon-core wire interface
7 Core ring rod
8 Sample
9 Clean booth
10 Supporting pillar
11 Shielding member
12 Header
13 Caster

The invention claimed is:

1. A polycrystalline silicon rod comprising:
a core wire formed of silicon and having an iron concentration of 5 pptw or less in terms of elements and a nickel concentration of 2 pptw or less in terms of elements,
wherein an iron concentration is 10 pptw or less in terms of element, a nickel concentration is 5 pptw or less in terms of elements and a total metal concentration of iron and nickel is 15 pptw or less in terms of elements in a region within 2 mm from an interface between the core wire and polycrystalline silicon deposited on a surface of the core wire.

2. The polycrystalline silicon rod according to claim 1, wherein in the region, a chromium concentration is 10 pptw or less in terms of elements.

3. A method for producing a polycrystalline silicon rod, comprising:
cleaning a surface of a silicon core wire;
connecting the silicon core wire to electrodes provided on a bottom plate of a reactor installed in a mobile clean booth and carrying out a horizontal flow convection in the reactor to attain an atmosphere adjusted to a cleanliness of Class 4 to Class 6 as defined in ISO 14644-1;
covering the bottom plate with a domical cover in the mobile clean booth while performing the horizontal flow convection from a period after said cleaning to said covering, wherein from a period from completion of said cleaning to said connecting, the silicon core wire does not come into contact with outside air and the mobile clean booth surrounds the bottom plate and has a height higher than the silicon core wire installed on the bottom plate;
removing the mobile clean booth after said covering;
supplying a polycrystalline silicon deposition raw material gas into the reactor while the silicon core wire is connected to the electrodes and is energized;

performing gas phase growth of polycrystalline silicon on a surface of the silicon core wire; and obtaining a polycrystalline silicon rod having an iron concentration of 10 parts per trillion by weight or less in terms of elements, a nickel concentration of 5 parts per trillion by weight or less in terms of elements, and a total metal concentration of iron and nickel of 15 parts per trillion by weight or less in terms of elements in a region within 2 mm from an interface between the silicon core wire and polycrystalline silicon deposited on the surface of the silicon core wire.

4. The method of claim 3, wherein the silicon core wire has an iron concentration of 5 parts per trillion by weight or less in terms of elements and a nickel concentration of 2 parts per trillion by weight or less in terms of elements.

5. The method of claim 3, wherein the horizontal flow convection comprises ejecting cleaned air into the reactor.

6. The method of claim 5, wherein the cleaned air replaces air inside the domical cover during said covering.

7. The method of claim 3, wherein the obtained polycrystalline silicon rod has a copper concentration of 5 parts per trillion by weight or less in terms of elements in a region within 2 mm from an interface between the silicon core wire and polycrystalline silicon deposited on the surface of the silicon core wire.

8. The method of claim 3, wherein the obtained polycrystalline silicon rod has a zinc concentration of 5 parts per trillion by weight or less in terms of elements in a region within 2 mm from an interface between the silicon core wire and polycrystalline silicon deposited on the surface of the silicon core wire.

* * * * *